United States Patent [19]

Spatz

[11] 3,929,825

[45] Dec. 30, 1975

[54] PYRAZOLOXANTHENE COMPOUNDS AND PROCESS FOR PRODUCING SAME

[75] Inventor: Sidney M. Spatz, Circleville, Ohio

[73] Assignee: The Mead Corporation, Dayton, Ohio

[22] Filed: Apr. 18, 1974

[21] Appl. No.: 461,860

[52] U.S. Cl...... 260/310 C; 260/310 D; 260/310 R; 428/323
[51] Int. Cl.$^2$................ C07D 231/54; C07D 231/56
[58] Field of Search......... 260/310 C, 310 D, 310 R

[56] References Cited
UNITED STATES PATENTS

| | | | |
|---|---|---|---|
| 3,501,331 | 3/1970 | Kimura et al. | 260/335 |
| 3,506,471 | 4/1970 | Kimura et al. | 260/335 |
| 3,514,310 | 5/1970 | Kimura et al. | 260/335 |

*Primary Examiner*—Donald B. Moyer
*Attorney, Agent, or Firm*—Earl B. Brookbank, Jr.

[57] ABSTRACT

This invention discloses novel pyrazoloxanthene compounds, useful as the color-formers or imaging sources in pressure-sensitive copy papers and in thermally-sensitive imaging papers, and a process for preparing these compounds.

16 Claims, No Drawings

PYRAZOLOXANTHENE COMPOUNDS AND PROCESS FOR PRODUCING SAME

BACKGROUND OF THE INVENTION

1. Field of the Invention

The pyrazoloxanthene compounds represented by general formula I are novel compounds which are useful as color formers in pressure or heat sensitive imaging papers. As prepared by the process of this invention these compounds are colorless, or only lightly colored. Upon contact with an acidic electron-acceptor material, the compounds of this invention are converted to resonance forms which are highly colored. This conversion to resonance form takes place as follows:

wherein $R_1$ and $R_2$ may be same or different and represent hydrogen or low alkyl groups containing one to four carbon atoms, $R_3$ is hydrogen or methyl, X and Y may be same or different and represent hydrogen, chlorine, bromine or low alkyl (1 or 3 carbon atoms), and A and B maybe the same or different and each is selected from hydrogen, halogen or methyl. When X and Y are hydrogen, $n$ is 4 and $m$ is 0. When X is hydrogen and Y is halogen or low alkyl $m$ is an integer ranging from 1 through 4 and $n$ is an integer ranging from 3 through 0, so that the sum of $m$ and $n$ is four.

A preferred process for producing compounds represented by Formula I involves the condensation of a

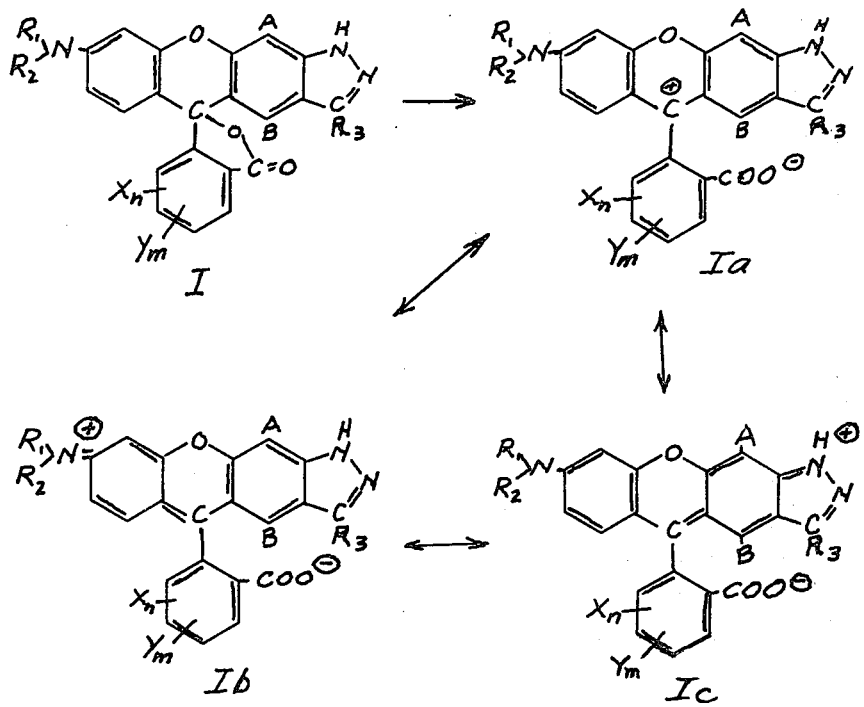

2. Description of the Prior Art

The prior art shows a number of chemical compounds which are stated to be useful as color formers. While these have the common property of converting from essentially colorless to highly colored resonance forms on contact with acidic electron acceptor materials, none of the prior art compounds includes a fused hetero-cyclic pyazolo ring on a kanthene structure.

DESCRIPTION OF THE INVENTION

The present invention relates to novel pyrazoloxanthene compounds and to a process for producing same. The novel pyrazoloxanthene compounds of the present invention are represented by the generic Formula I:

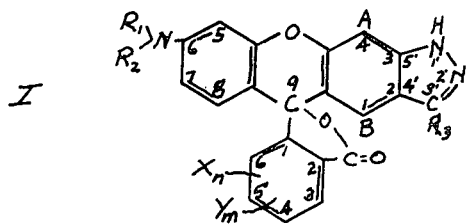

2-(4'-N,N-substituted amino-2'-hydroxybenzoyl)-benzoic acid, Formula II,

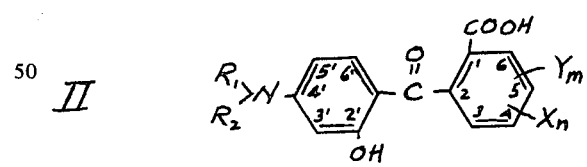

wherein $R_1$, $R_2$, X, Y, m and n are the same as defined for Formula I, with a 6-hydroxy- or 6-alkoxy-indazole of Formula III, wherein $R_3$ is the same as defined for Formula I, $R_4$ is

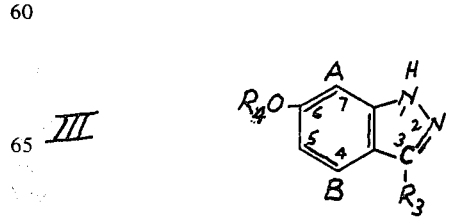

hydrogen, methyl or ethyl, and A and B are the same as defined for Formula I.

Typical examples of Formula II compounds are 2-(4'-N,N-dimethylamino-2'hydroxybenzoyl)benzoic acid, 2-(4'-N-methyl-N-propylamino-2'hydroxybenzoyl)benzoic acid, 2-carboxy-3,4,5,6-tgetrachloro-2'-hydroxy-4'-dimethylaminobenzophenone, and the like. These intermediates are prepared by a known process involving the condensation of phthalic anhydride with a m-aminophenol or properly substituted m-aminophenol, See U.S. Pat. No. 3,501,331.

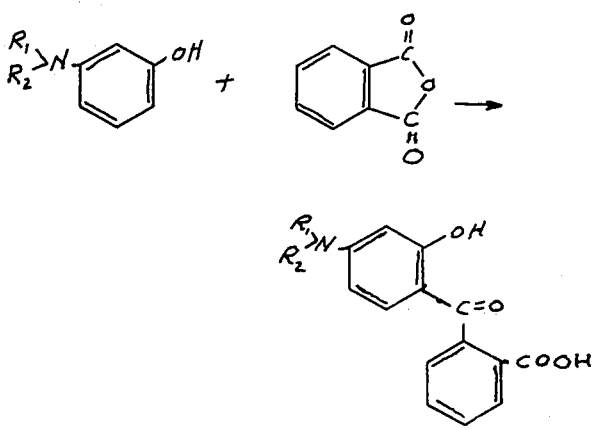

Typical examples of Formula III compounds are 6-, hydroxyindazole, 6-methoxyindazole, 7-chloro-6-hydroxyindazole, 7-bromo-6-hydroxyindazole, 6-methoxy-5-nitroindazole, and 6-methoxy-3-methylindazole. These also are known compounds.

The process for preparing the compounds of Formula I comprises condensation in an acidic medium of essentially equimolar quantities of the starting materials represented by Formulae II and III. These materials are reacted from 1 to 24 hours at 35° to 110°C, but preferably for 2 to 4 hours at 70° to 95°C. When the acidic medium is sulfuric acid, 60% minimal concentration may be used, but a preferred concentration is 80–95%. The higher concentrations are more effective in keeping the reactants in solution than the more dilute acids. Other acidic condensation mediums may be used, such as a mixture of sulfuric acid and phosphoric anhydride, polyphosphoric acid, certain Lewis acids such as zinc chloride and phosphorus oxychloride. Sulfuric acid is the preferred condensation medium because of its low cost, ease of handling and non-volatility, generally yielding clear reaction solutions capable of straightforward processing by simply cooling and diluting the reaction in ice water and then recovering the reaction product in one of several ways.

A preferred set of conditions for preparing the compounds of this invention comprises the condensation of equimolar quantities of the keto acid (II) with the 6-hydroxy- or 6-methoxy-indazole (III) in 80–96% sulfuric acid at 90°–92°C. for 3 to 3.5 hours, followed by cooling, diluting in ice water and bringing the reaction mix to pH 8–8.5 with ammonium hydroxide. The products of this invention are then isolated by filtration in a high degree of purity and in most cases need not be purified further for commercial use in making copy or imaging papers. However, the compounds may be purified by methods conventional for the purification of organic chemical solids.

That the structures of the compounds obtained by the aforesaid reaction and process conform to the general structure represented by Formula I was established by a combination of elementary analysis and infrared spectroscopy. All of the IR spectra showed a strong absorbance band at or near 1750 cm$^{-1}$, characteristic of the carbonyl group of the lactone ring, and a band at or near 3300 cm$^{-1}$ attributable to the >NH group of the pyrazolo ring in Formula I. The found elementary analyses for carbon, hydrogen, nitrogen and chlorine checked the calculated or theoretical values closely as may be seen in the examples.

The chemical equation representing the formation of the compounds of Formula IV (See Example 1) is shown below:

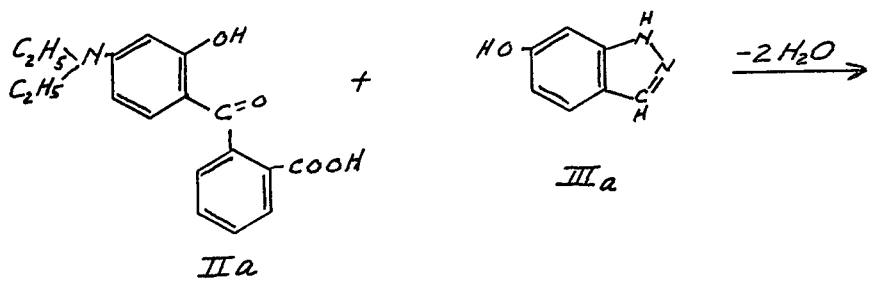

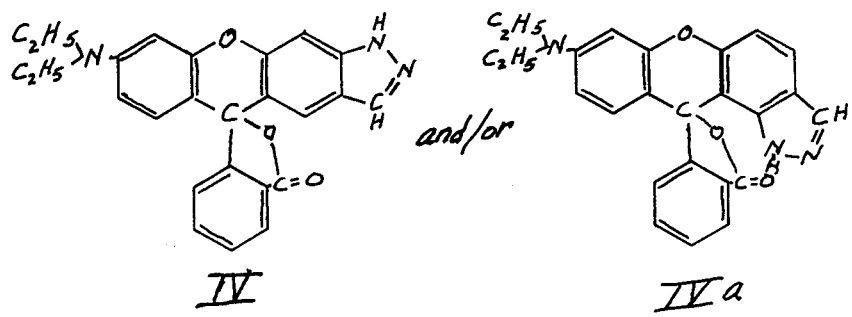

Theoretically the reaction of IIa and IIIa may also yield the isomeric IVa either partially or exclusively. The presence of IVa would not be distinguished from IV by the infrared and elementary analytical data used herein. However, for the present I prefer the structural assignment IV to IVa because the pathway to its formation is less sterically hindered than that to IVa. Regardless of the details of fine structure, my invention is concerned with the products obtained from the acid condensation of Formula II compounds with Formula III compounds and with the colors obtained from these condensation products on reaction with electron-acceptor or acidic materials such as the protic acids, e.g., organic acids, phenolic acids, phenols, diphenols, phenolic resins and aprotic acids, e.g., Lewis acids, acid clays, and the like.

It should be noted that when the A substituent in position 7 of Formula III is a blocking substituent such as Cl, Br or $CH_3$, then the cyclic condensation can be expected to go exclusively to the structure represented by I or IV. On the other hand, if a blocking substituent is in position 5 of Formula III, the cyclic condensation can be expected to yield exclusively the structure IVa.

The reaction of the colorless color precursor IV, or any other structure conforming to generic structure I, with an acidic electron-acceptor material will yield a highly colored material represented by resonance extremes of the dye. The spectral characteristics of several of these dyes in 90% acetic acid are summarized in Table I. The dye structures in resonance form follow:

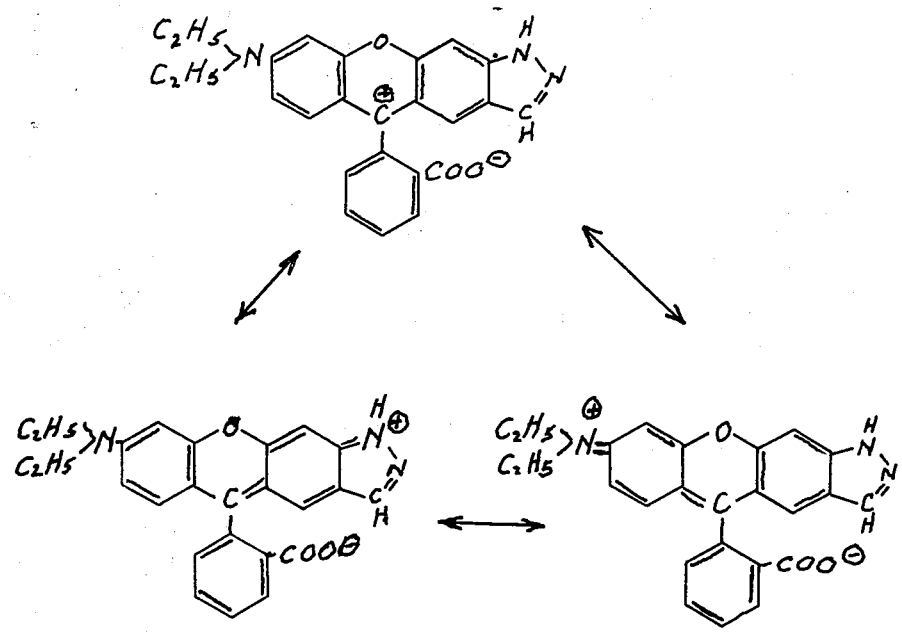

The dye structures in resonance form for the isomeric compound IVa follow:

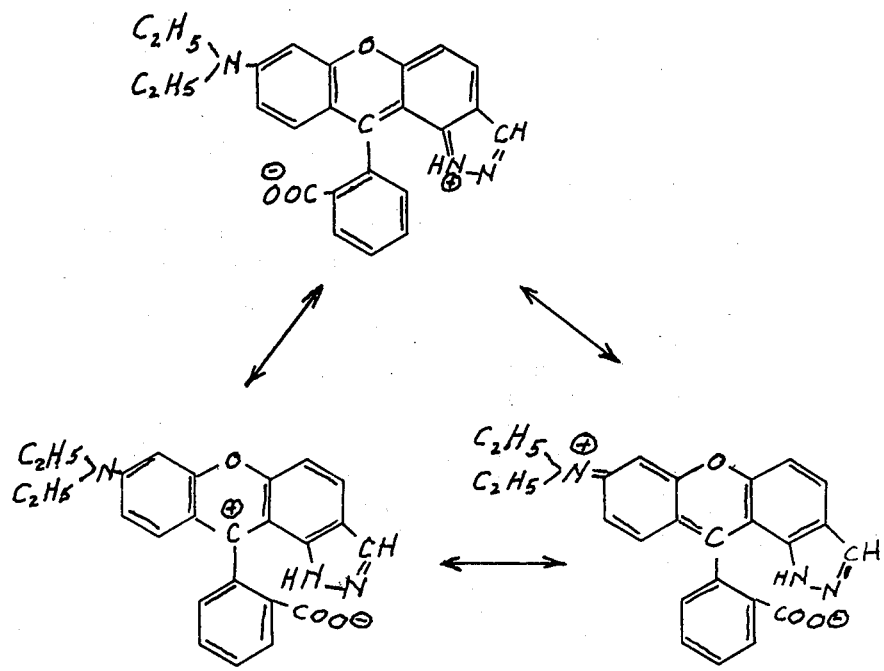

The compounds of this invention prepared as described and represented by general Formula I are novel compounds. Solutions of these compounds, dissolved in organic solvents such as benezene, acetone, etc., produce intense red to purple images when brought into contact with solid acids such as organic acids, phenolic resins, acid clays or with mixtures of such electron acceptor materials. When the phthalido portion of Formula Compound I is unsubstituted or contains a methyl group, the resulting colorless color-former yields a red color. When the phthalido portion is a tetrachloro-substituted phthalido moiety, the resulting color precursor yields a purple color. Thus, these color precursors are useful as color-formers for pressure-sensitive copy papers, thermally-sensitive imaging papers and other copy or image applications. Furthermore, the images obtained from the color-precursors of this invention are readily copiable from electrostatic copy machines. So in suitable admixture with blue-and orange-producing precursors or with blue and green-producing precursors, the precursors of this invention can yield deep-blue or blue-black, copiable images.

The dyes formed from these novel compounds of generic structure I, whether formed in solution as in 90% acetic acid (cf. Table I) or produced by contact from solutions in organic solvents with solid electron-acceptors such as acidic clays, organic acids, inorganic acids, phenols and phenolic resins, coated on or impregnated in paper or other base stock, are also novel materials, and are exemplified by the resonance structures of the dyes as shown supra.

The examples which follow illustrate, but do not limit the preferred embodiments of this invention.

EXAMPLE 1

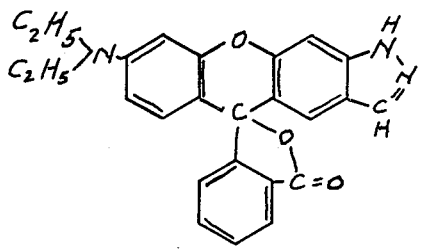

IV 6-diethylamino-2,3-(4', 5'-pyrazolo) fluoran (Formula IV) was prepared by adding a mixture of 4.0 g (0.03 mole) of 6-hydroxyindazole and 9.4 g (0.03 mole) of 2-(4'-N,N-diethylamino-2'-hydroxybenzoyl)benzoic acid portionwise to 104 g of 80% sulfuric acid. The reaction mixture rose from room temperature to 31°C. The reaction mixture was brought to 92°C (±2°) with agitation and kept at temperature for 3 hours. The reaction solution was cooled to room-temperature, and poured in a thin stream to 450g ice-water under vigorous agitation. After 1–2 hours of agitation, the mix was neutralized with ammonium hydroxide to pH 8.5 and stirred for two hours. The crude product, pale-pink crystals, was isolated by filtration. The yield of product, melting at 261°C, was 11.4g (92.5% of theory). Recrystallization of the product from chloroform/methanol to almost white crystals raised the melting point to 276°–277°C.

Solution of the product from acetone, ethanol or benzene gave red colors on paper coated with kaolin-phenolic resin mix or with Silton Clay.

Analysis: Calculated for $C_{25}H_{21}N_3O_3$: C, 72.98%; H, 5.14%; N, 10.21% Found: C, 73.08%, H, 4.97%; N, 10.08%.

The IR spectrum showed an absorbance band at 3290 cm$^{-1}$, attributed to the stretch frequency for the >NH group in the pyrazolo moiety; and a strong carbonyl band for lactone at 1780 cm$^{-1}$.

The visible spectrum in 90% acetic acid from a Beckman DK-2 spectrophotometer showed four λ maxima, summarized in Table I:

TABLE I

VISIBLE SPECTRA DATA FOR VARIOUS PYRAZOLOXANTHENES

| Max | Example 1 | 2 | 3 | 4 | 5 |
|---|---|---|---|---|---|
| $\lambda_1$, mµ | 514 | 513 | 512 | 512 | 534 |
| $\lambda_2$, mµ | 545 | 540 | 539 | 544 | 568 sh |
| $\lambda_3$, mµ | 475 sh | 473 sh | 473 sh | 475 sh | 489 sh |
| $\lambda_4$, mλ | 415 | 412 | 412 | 413 | 427 sh |

(sh = shoulder)

EXAMPLE 2

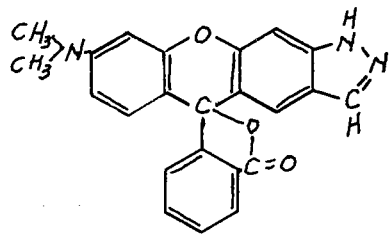

V

The 6-dimethylamino-2,3-(4', 5'-pyrazolo) fluoran represented by Formula V, was prepared in the same manner as for Example 1 by the condensation of 5.36 g (0.04 mole) of 6-hydroxyindazole with 11.38 g (0.04 mole) of 2-(4'-dimethylamino-2'-hydroxybenzoyl)benzoic acid in 130 g of 80% sulfuric acid at 90°–92°C for 3 hours. The yield of product melting at 300°C was 13.4 g (87.4%) of theory.

Solutions of the product in acetone, acetone/benzene, chloroform or dioxane gave red colors on paper coated with phenolic resin or Silton Clay.

Analysis: Calculated for $C_{23}H_{17}N_3O_3$: C, 72.05%, H, 4.47%; N, 10.96%. Found: C, 71.76%: H, 4.50%; N, 11.04%.

The IR spectrum showed the >NH absorbance band of the pyrazolo ring at 3350 cm$^{-1}$ and the characteristic stretch frequency of lactone carbonyl at 1760 cm$^{-1}$, both strong.

The λ maxima of Compound V in 90% acetic acid are shown in Table I.

EXAMPLE 3

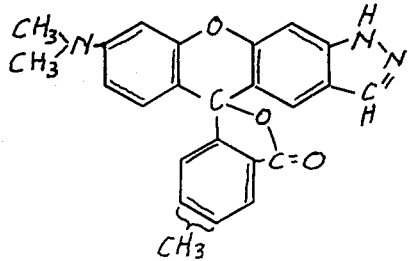

VI

6-Dimethylamino-2,3-(4';5'-pyrazolo)-9-spiro-(4methylphthalido) xanthene and the -(5-methylphthalido) isomer, represented by Formula VI, were prepared as a mixture from 4.0 g (0.03 mole) of 6-hydroxyindazole and 8.92 g (0.03 mole) of a mixture of 2-(4'-dimethyl-amino-2'-hydroxybenzoyl)-4- and -5-methylbenzoic acids in 104 g of 80% sulfuric acid in the manner described for Example I.

The unrecrystallized product (Compound VI) was obtained as a light pink crystalline material in a yield of 10.1 g (85% of theory) and melted at 280°–281°C. Purification by digestion in hot acetone-water reduced the over-all yield to 77.7% of theory and raised the melting point to 292°–293°C.

The product gave intense red images on Silton acid clay and kaolin modified with phenolic resin, as representative examples of the acidic developers which are capable of producing color with the compounds of this invention. These images could be copied by electrophotographic means such as a Xerox Model 2400 copier.

Analysis: Calculated for $C_{24}H_{19}N_3O_3$: C, 72.52%; H, 4.82% N, 10.57%. Found: C, 72.44%, H, 4.84%; N, 10.44%.

The IR spectrum from KBr pellet on a Beckman IR4 showed strong stretch frequency bands for the >NH group of the pyrazolo ring at 3370 cm$^{-1}$ and for the —C=O group of the cyclic lactone at 1760 cm$^{-1}$, respectively.

The λ maxima of Compound VI in 90% acetic are summarized in Table I. The presence of the methyl group in the phthalido ring did not produce a bathochromic shift.

EXAMPLE 4

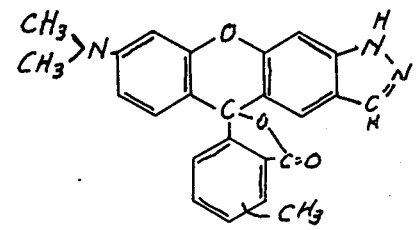

VII

A mixture of 6-dimethylamino-2,3-(4', 5'-pyrazolo)-9-spiro-(3-methylphthalido)xanthene and the - (6-methylphthalido) isomer, represented by Formula VII, was prepared by the condensation of equimolar quantities of 6-hydroxyindazole and a mixture of 2-(4'-dimethylamino-2'-hydroxybenzoyl)-3-and-6-methylbenzoic acid under conditions very similar to those used for Example 1. A light gray-purple product was obtained in a yield of 63% of theory, with a melting point of 295°–296°C.

A solution of the product yielded red colors on acidic developers such as kaolin treated with a phenolic resin and Silton clay.

Analysis: Calculated for $C_{24}H_{19}N_3O_3$: C, 72.52%; H, 4.82% N, 10.57%. Found: C, 72.37%; H, 7.67%; N, 10.43%.

The IR spectrum from KBr pellet showed strong bands for the >NH group in the pyrazolo ring at 3380 cm$^{-1}$ and for the lactone -C=O group at 1748 cm$^{-1}$. The visible λ maxima are shown in Table 1.

EXAMPLE 5

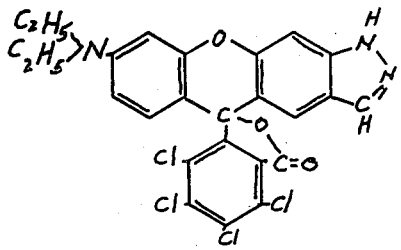

VIII

From the reaction mix of 4.0 g (0.03 mole) of 6-hydroxyindazole and 13.53 g (0.03 mole) of 2-carboxyl-3,4,5,6-tetrachloro-2'-hydroxy-4'-dimethylaminobenzophenone in 96% sulfuric acid, maintained at 90°C for 3.5 hours, there was obtained after cooling, drowning, neutralization and filtration 14.84 g (90% yield) of light-purple powder melting at 182°C. This unrecrystallized product contained very little dye impurity as indicated by the extremely pale color produced by this color precursor on bond paper as compared to the intense purple color produced by papers having surface coatings of electron acceptors such as Silton acid clay, phenolic resin and the like. The intense purple color could be copied by such electrophotographic means as Xerox Model 600 and Model 2400 copiers.

Recrystallization of the product from acetone with aid of a carbon-black (Norit-PolyCarb C) and a filter aid gave a pale tan-pink product melting at 234°–235°C. The product is 6-diethylamino-2,3-(4', 5'-pyrazolo)-9-spiro-(3,4,5,6-tetrachloro) phthalidoxanthene (Compound VIII).

Analysis: Calculated for $C_{25}H_{17}N_3O_3Cl_4$: C, 54.67% H, 3.12%; N 7.65%; Cl, 25,82%. Found C, 54.46%; H, 3.13%; N, 7.53%; Cl, 25.79%.

The IR spectrum showed the N-H stretch frequency of the NH group of the pyrazolo ring at 3220 cm$^{-1}$ and a strong lactone carbonyl frequency at 1740 cm$^{-1}$.

The λ maxima for the visible spectrum of Compound VIII in 90% acetic acid are shown in Table I.

Pressure sensitive copy papers are known which use an acid reacting material on the top surface thereof, and an overlying surface having micro-capsules containing a color former in an oil solution, as shown, for example, in U.S. Pat. No. 2,712,507. Alternatively, the acid reacting material and micro-capsules containing the oil solution of the color former can be intermixed and applied to the surface of a support such as paper or the like.

Application of pressure, as by a typewriter key, ruptures the micro-capsules, causing the color former-oil solution to contact the acid-reacting material, resulting in color formation. In the case where the acid-reacting material and the micro-capsules containing the oil solution of the color former are on separate surfaces, it is necessary that the surfaces be in contact during the application of pressure to permit the transfer of the color former-oil solution from ruptured microcapsules to the acid-reacting material. Examples of suitable acid reacting materials have been given supra.

Oil solutions of the pyrazoloxanthene compounds of this invention, either alone or with other color formers, may readily be encapsulated by a variety of methods, as for example, the method described in U.S. Pat. No. 2,800,457. When used alone, the compounds of this invention produce intense red to purple colors. When used in suitable admixture with blue-and orange-producing color formers, or with blue-and green-producing color formers, deep blue or blue-black colors are produced.

Thermo-imaging copy systems are also known, see for example, U.S. Pat. No. 2,663,657. For this use, micro-capsules containing a solution of a pyrazoloxanthene compound are prepared having capsule wall material which is ruptured by heating. Such capsules are admixed with acid reacting material in a matrix of a heat sensitive material such as a wax, and applied to a suitable paper substrate. Visible markings are produced when such a thermo-imaging paper is processed with an original to be copied in a thermo-imaging apparatus.

I claim:

1. A process for producing a color precursor having a pyrazoloxanthene structure by
    1. reacting about eqimolar quantities of at least one member of (A) with (B) wherein
       A. is a 2-(4'-N,N-substituted amino-2' hydroxybenzoyl)benzoic acid having the formula

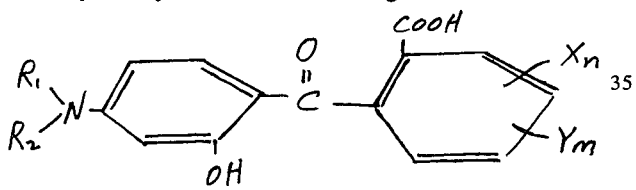

wherein $R_1$ and $R_2$ are hydrogen or lower alkyl groups of from 1 to 4 carbon atoms, X and Y are hydrogen, haolgen or lower alkyl of from 1 to 3 carbon atoms and n and m are integers whose sum is 4, and
       B. is a 6-hydroxy or lower alkoxy indazole having the formula

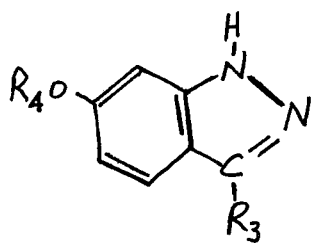

wherein $R_3$ is hydrogen or methyl and $R_4$ is hydrogen, methyl or ethyl,
    2. for a time period ranging from 1 to 24 hours,
    3. at a temperature ranging from 110° to 35°C,
    4. in sulfuric acid having a concentration above 70%, and thereafter recovering the reaction product.

2. The process of claim 1, wherein said 2-(4'-N,N-substituted amino-2'-hydroxybenzoyl)benzoic acid is selected from the group consisting of 2-(4'-N,N-diethylamino-2-hydroxybenzoyl)- benzoic acid, 2-(4'-N,N-dimethylamino-2-hydroxybenzoyl)benzoic acid, 2-(4'-N,N-dimethylamino-2'-hydroxybenzoyl)-4-and/or-5-methylbenzoic acid, 2-(4'N,N-dimethylamino-2'-hydroxybenzoyl)-3-and/or-6-methylbenzoic acid, and 2-carboxy-3,4,5,6-tetrachloro-(2'hydroxy-4'-dimethylamino)benzophenone.

3. The process of claim 1 wherein the said indazole is selected from the group consisting of 6-hydroxyindazole and 6-methoxyindazole.

4. The process of claim 1 wherein 6-hydroxyindazole is reacted with 2-(4'-N,N-diethylamino-2'-hydroxybenzoyl)-benzoic acid.

5. The process of claim 1 wherein 6-hydroxyindazole is reacted with 2-(4'-N,N-dimethylamino-2' hydroxybenzoyl)-benzoic acid.

6. The process of claim 1 wherein 6-hydroxyindazole is reacted with a mixture of 2-(4'-N,N-dimethylamino-2' hydroxybenzoyl)-4 methyl benzoic acid and 2-(4'-N,N-dimethylamino-2'-hydroxybenzoyl)-5 methyl benzoic acid.

7. The process of claim 1 wherein 6-hydroxyindazole is reacted with a mixture of 2-(4'-N,N-dimethylamino-2'-hydroxybenzoyl)-3 methyl benzoic acid and 2-(4'-N,N-dimethylamino-2'-hydroxybenzoyl)-6 methyl benzoic acid.

8. The process of claim 1 wherein 6-hydroxyindazole is reacted with 2-carboxyl-3,4,5,6-tetrachloro-2'-hydroxy-4'-dimethylaminobenzophenone 9. Color precursor produced by the process of claim 1.

10. Color precursor produced by the process of claim 2.

11. Color precursor produced by the process of claim 3.

12. The color precursor produced by the process of claim 4.

13. The color precursor produced by the process of claim 5.

14. The color precursor produced by the process of claim 6.

15. The color precursor produced by the process of claim 7.

16. The color precursor produced by the process of claim 8.

* * * * *